(12) United States Patent
Klein

(10) Patent No.: US 7,200,736 B2
(45) Date of Patent: *Apr. 3, 2007

(54) METHOD AND SYSTEM FOR SUBSTANTIALLY REGISTERLESS PROCESSING

(75) Inventor: Dean A. Klein, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 301 days.

This patent is subject to a terminal disclaimer.

(21) Appl. No.: 10/846,070

(22) Filed: May 14, 2004

(65) Prior Publication Data

US 2004/0215935 A1  Oct. 28, 2004

Related U.S. Application Data

(63) Continuation of application No. 09/655,004, filed on Aug. 31, 2000, now Pat. No. 6,738,895.

(51) Int. Cl.
G06F 9/00 (2006.01)

(52) U.S. Cl. .................. 712/205; 712/228

(58) Field of Classification Search ........... 712/207, 712/205, 228, 202
See application file for complete search history.

(56) References Cited

U.S. PATENT DOCUMENTS

| | | | | |
|---|---|---|---|---|
| 4,371,931 | A | 2/1983 | Catiller et al. .......... 364/200 |
| 4,498,135 | A | 2/1985 | Caudel ................... 364/200 |
| 4,680,701 | A | * 7/1987 | Cochran ................. 712/40 |
| 5,008,807 | A | 4/1991 | Krueger et al. ......... 364/200 |
| 5,121,498 | A | 6/1992 | Gilbert et al. .......... 395/700 |
| 5,206,940 | A | 4/1993 | Murakami et al. ...... 395/400 |
| 5,487,146 | A | 1/1996 | Guttag et al. .......... 395/166 |
| 5,574,883 | A | * 11/1996 | Freeman .............. 711/119 |
| 5,659,690 | A | 8/1997 | Stuber et al. .......... 395/309 |

(Continued)

OTHER PUBLICATIONS

Miller, Edward F., *A Multiple-Stream Registerless Shared-Resource Processor*, IEEE Transactions on Computers, vol. C-23, No. 3, Mar. 1974, pp. 277-285.

Primary Examiner—Eric Coleman
(74) Attorney, Agent, or Firm—Dorsey & Whitney, LLP

(57) ABSTRACT

A simple instruction set processor preferably utilizes six primary components: a fetch unit, and instruction and address register, a controller/decoder, an arithmetic logic unit, an address multiplexer, and a storage multiplexer. The processor utilizes a data stream containing within it the address for a subsequent instruction to be executed by the processor, thereby avoiding the need for registers of the type utilized in prior art processors. As a result, the processor utilizes a minimal number of registers to perform its operations. The processor utilizes an instruction set in which every instruction contains a JUMP to the next instruction. By utilizing JUMPs in every instruction and providing the address to which the processor is to JUMP, there is no need for address counters and register pointers. Also, extremely fast state changes are facilitated the contents of only one register identifying a next address must be saved or restored. By eliminating data registers, data streams of any width may be supported by suitably utilizing a plurality of processor connected in parallel. The elimination of multiple registers enables the processor to more easily be embedded within memory arrays themselves. The processor preferably utilizes six primary components: a fetch unit, and instruction and address register, a controller/decoder, an arithmetic logic unit, an address multiplexer, and a storage multiplexer.

57 Claims, 4 Drawing Sheets

U.S. PATENT DOCUMENTS

| | | | |
|---|---|---|---|
| 5,748,806 A * | 5/1998 | Gates | 710/315 |
| 5,864,707 A | 1/1999 | Tran et al. | 395/800.23 |
| 5,940,857 A | 8/1999 | Nakanishi et al. | 711/137 |
| 5,968,139 A | 10/1999 | Klein | 710/10 |
| 6,006,310 A | 12/1999 | Klein | 711/128 |
| 6,014,734 A | 1/2000 | Tran et al. | 712/23 |
| 6,078,985 A | 6/2000 | Lakhani et al. | 711/5 |
| 6,079,006 A | 6/2000 | Pickett | 711/213 |
| 6,088,787 A | 7/2000 | Predko | 712/202 |
| 6,108,719 A | 8/2000 | Klein | 710/10 |
| 6,134,609 A | 10/2000 | Klein | 710/52 |
| 6,175,891 B1 | 1/2001 | Norman et al. | 711/5 |
| 6,212,630 B1 | 4/2001 | Takayama et al. | 712/242 |
| 6,240,508 B1 | 5/2001 | Brown, III et al. | 712/219 |
| 6,253,277 B1 | 6/2001 | Lakhani et al. | 711/5 |
| 6,269,436 B1 | 7/2001 | Tran et al. | 712/23 |
| 6,330,667 B1 | 12/2001 | Klein | 713/1 |
| 6,378,047 B1 | 4/2002 | Meyer | 711/135 |
| 6,393,507 B2 | 5/2002 | Klein | 710/129 |
| 6,401,186 B1 | 6/2002 | Blodgett | 711/213 |
| 6,405,280 B1 | 6/2002 | Ryan | 711/105 |
| 6,449,709 B1 | 9/2002 | Gates | 712/202 |
| 6,507,885 B2 | 1/2003 | Lakhani et al. | 711/5 |
| 6,738,895 B1 * | 5/2004 | Klein | 712/205 |

* cited by examiner

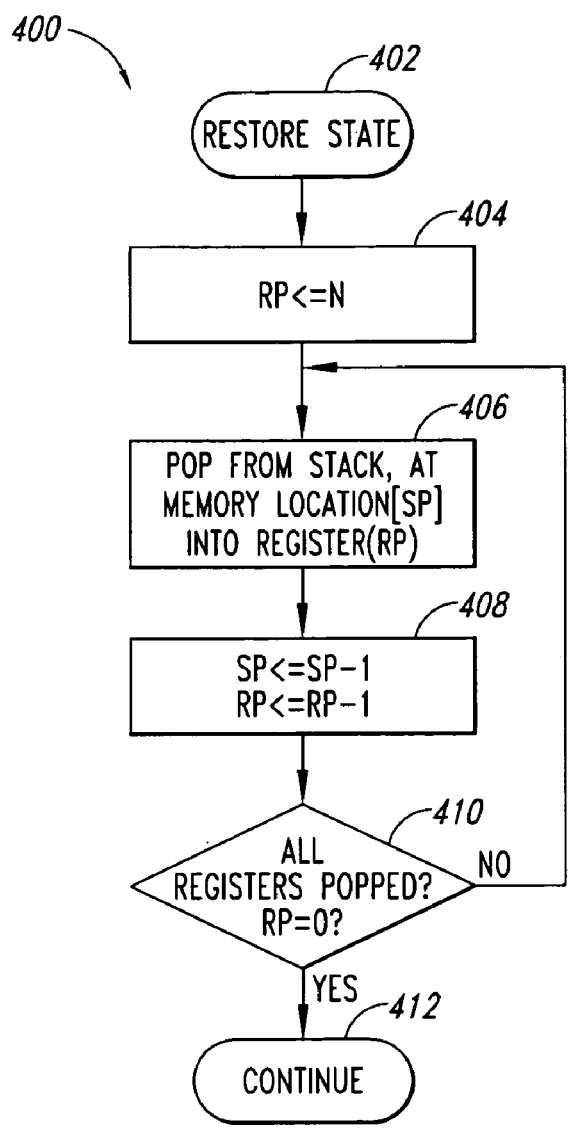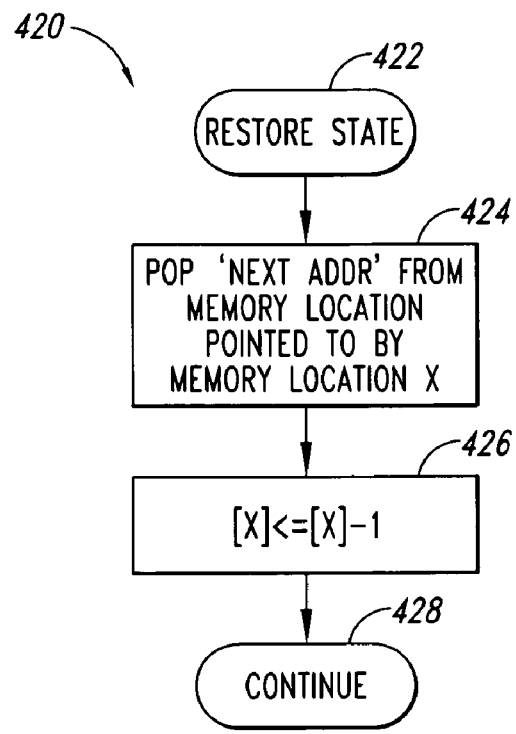
Fig. 4A
(Prior Art)
Fig. 4B

METHOD AND SYSTEM FOR SUBSTANTIALLY REGISTERLESS PROCESSING

CROSS REFERENCE TO RELATED APPLICATION

This application is a continuation of U.S. patent application Ser. No. 09/655,004, filed Aug. 31, 2000, U.S. Pat. No. 6,738,895.

FIELD OF THE INVENTION

The present invention relates to processors for computer systems and, more specifically, to processors utilized in conjunction with and/or embedded within memory devices.

BACKGROUND OF THE INVENTION

Automated systems commonly utilize Central Processing Units (CPU) connected to various peripheral devices including caches, memory storage devices, and numerous peripherals over various busses and other interconnections. Generally, designers of automated systems have strived to improve system performance by increasing CPU processing speeds, bus speeds, memory utilization rates, and various other parameters. Additionally, significant efforts have been undertaken to simultaneously reduce the size and power requirements of such systems. While significant reductions in size and power requirements have occurred, software programs used by many of today's systems have tremendously increased in size and complexity. As a result, today's designers are often faced with the daunting challenge of having to squeeze ever more data, including video data and audio data, through CPUs at ever increasing rates while decreasing the size and power requirements of such systems.

For many applications, the ability of CPUs to process large quantities of data is often dictated by how fast, how much, and how quickly the CPU can obtain information from and/or write to memory or other data storage devices. As is well known in the art, today's systems often include multiple data storage devices, such as Random Access Memory (RAM), Read Only Memory (ROM), and various other peripheral storage devices such as hard disc drives, and write/rewritable magnetic and optical storage devices. Additionally, CPUs often obtain data from various non-localized data storage devices via communications networks such as the Internet. Since each storage device often contains data which is specified in variable word lengths and since today's CPUs generally utilize registers of fixed widths, the CPU commonly has to repeatedly request segments of the data until an entire data word is processed.

In most computer applications, the process of retrieving data from a memory location often takes longer than the time necessary to actually process the given quantity of data because the ability of the CPU to process information is significantly greater than its ability to retrieve information from memory storage devices. In order to speed up the processing capabilities of CPUs, many system designers utilize cache memory, which may be built onto the same chip as the processor itself. While caching certain segments of code is helpful in processing routine instructions, for many applications, such as data mining, speech recognition and video image processing, caching such information is generally not practical. As a result, for many applications, CPUs generally have to recall vast quantities of information from memory storage devices in byte sizes set by the size of registers.

Additionally, since registers are commonly provided in pre-set widths (i.e., 64 bits or 32 bits), multiple registers are often needed to download/retrieve large quantities of data from a storage device within a reasonable time period. These registers are often directed to download data and then hold it until the CPU is ready to perform a specific task. When configured in this manner, many systems result in CPUs with large numbers of registers, each of which increase power requirements and inhibit system miniaturization. For example, the popular Pentium III® processor utilizes over 100 registers to support its various features and functions.

As is commonly known in the art, CPU's often begin the processing of large quantities of data by first determining a location for the data (i.e., the address), then fetching the data provided at the address, processing the fetched data, determining a location (i.e., a second address) where the result of the data processing is to be sent, sending the result to the second location, and then determining an instruction pointer, which preferably contains the address for the next instruction. Generally, the first address, the data, the second address, the result location, and the instruction pointer are provided in a memory array in sequential order. The memory is generally configured in sequential order during compiling so that the number of JUMPs are limited and the processing needed to determine which instruction is to be processed next is reduced. While compiling a program to reduce the number of JUMPs is often desirable from a CPU processing viewpoint, compiling often results in memory arrays which are not utilized to their maximum capacity. Instead, many memories often have significant blocks in which data may be stored that are never used.

Additionally, while compilers often attempt to create software instructions that flow from one sequence line to a next, in reality, much of today's software code contains JUMPs, conditional branches, loops, and other data flow techniques. Since these software programs often do not naturally flow from one line to the next, system designers generally must also keep track of code locations via address pointers, and various other devices, each of which require additional registers and additional power.

Additionally, currently available CPUs commonly require multiple instructions and processing steps to accomplish some of the simplest tasks, such as adding two operands. For example, currently available CPUs often execute an instruction requiring Operand 1 to be added to Operand 2 by performing the following steps:
1. Fetch ADD instruction from location pointed to by Instruction Pointer ("IP"), and load the instruction into an instruction register;
2. Decode the instruction and store in instruction register;
3. Access a location in memory where a first operand is located, obtain the value for the first operand and store it in a temporary register;
4. Access a second location in memory where a second operand is located, obtain the value for the second operand and store it in a temporary register;
5. Perform the operation specified in the instruction register on the first and second operands by transferring the instruction and the first and second operands from their respective registers to the ALU;
6. Determine where the result of the ALU process is to be stored;
7. Store the results data to the determined location; and
8. Determine the next address for the next instruction, which may require a JUMP to another memory location.

While the above operation may be accomplished extremely quickly for a single mathematical calculation, today's CPUs often are required to process millions of transactions a second. When utilized on this magnitude, the constant reading, storing, addressing, and writing to and from memory via registers may significantly degrade a system's performance.

Therefore, since today's CPU often spend inordinate amounts of time determining from where data and instructions are to be obtained and/or stored, storing the data, processing data, determining where the result of the data processing is to be stored, and then actually storing the result, a system is needed that reduces the amount of time a CPU spends determining where to obtain data and actually fetching the data needed for processing.

Additionally, many of today's systems control numerous input/output devices, all of which are constantly requesting processor time. Each time a processor determines that a different Input/Output (I/O) device or a different processing routine needs to be executed, the processor commonly performs a state change. In a Windows® multi-tasking environment, state changes occur often because the various devices connected to the I/O bus are continuously jostling for the attention of the processors.

As shown in FIG. 3A, the process by which many currently available processors perform a state change often requires numerous steps. The state change operation begins at 302 when a processor receives a request to stop processing a first task and to begin, as soon as possible, processing a second task. When a state change request is received, the CPU sets a register pointer equal to zero at step 304 and begin transferring the contents of each register utilized by the CPU into memory at a location specified by a stack pointer. The data transfer continues through steps 306–310 until the contents of each register utilized by the CPU are copied to a block of memory, often in sequential order. As each register is transferred, the CPU also increments the stack pointer and a register pointer until the value of the register pointer equals the total number of registers whose contents need to be saved. At this point, the CPU is ready to implement the desired state change (i.e., the registers may now be loaded with new instructions, addresses, and operands). For advanced CPUs, such as Pentium IIIs, which utilize hundreds of registers, implementing a state change can often take many microseconds.

FIG. 4A shows a process 400 by which many current systems recover from a state change (i.e., resume the processing interrupted by the state change). Generally, the process 400 of recovering to the first state requires as many processing steps as does the changing of states to process the second task. As shown, the recovery operation begins at 402 when the CPU receives a direction that indicates the second task has been completed and that the first task may be restored. Next, the processor sets a register pointer equal to or less than the number of registers available to the CPU at step 404, and begins transferring the contents of memory from the location specified by the stack pointer into the appropriate registers until the contents have been restored for all of the registers which changed states in steps 406–410. After all of the registers are restored, the CPU then resumes processing the steps needed for the first task.

In many environments, such as the Microsoft® Windows® operating system, state changes occur frequently. These state changes often interrupt the performance of user interface devices, such as keyboards and audio and video display devices. Therefore, a system is needed which enables a CPU to more efficiently perform state change operations.

SUMMARY OF THE INVENTION

The present invention provides a microprocessor which does not utilize registers to temporarily store data used by an arithmetic logic unit, a controller, or similar component. More specifically, the present invention provides a microprocessor which utilizes a data stream containing embedded addresses to process operations and read and write data directly from memory and other data storage devices.

By providing an address embedded within a data stream, the present invention allows a microprocessor to be utilized which does not store data (ie., instructions, addresses, and operands) in registers prior to and/or after execution of a processing step. Instead, the present invention preferably utilizes addresses embedded within the data stream to immediately determine from where operands are to be obtained, where a result of a processing step is to be stored, and where a next instruction is located. By preferably utilizing orthogonal data streams, the present invention enables a microprocessor to directly access data to/from storage devices. As such, the processor of the present invention is not limited by registers as to the size of words which may be processed and encourages the use of parallel microprocessors to simultaneously manipulate data streams of any width. Similarly, the present invention eliminates the need for address pointers, stack pointers, register pointers and various other flow and control registers and devices commonly utilized by today's CPUs to determine where data is to be obtained and/or stored.

By providing within a data stream an address for the next instruction to be implemented by a microprocessor, the present invention is able to accomplish every transition from a first instruction to a second instruction via a JUMP. Utilizing JUMPs instead of address counters/pointers greatly simplifies the logic utilized when compiling software code sequences. Instead of compiling a software routine such that instructions follow each other in sequential order (and thus JUMPs are minimized), every transition between instructions is treated as a JUMP and thereby encourages a compiler to maximize code usage, minimize memory needs, expand code sequences, and compile a software code based upon considerations other than minimizing JUMPs. As such, the compiler is able to maximize the utilization of memory.

The present invention also preferably simplifies state change operations. Instead of requiring a processor to record the values of numerous registers every time a state change is requested, only the address for the next instruction must be recorded, preferably in a single register, prior to performing the state change. Similarly, when recovering from a state change, only the address for the next instruction must be restored, and there is no need to restore registers with values of operands, instructions, destination addresses, or the like because such data is preferably obtained directly from memory and is not stored temporarily in registers.

The foregoing and various other features and functions of the present invention are explained in detail with reference to the drawing figures and the following detailed description of the invention.

BRIEF DESCRIPTION OF THE DRAWINGS

FIG. 4A is a flow diagram representing the processing steps by which a prior art processor returns to an original state after a state change.

FIG. 4B is a flow diagram representing the processing steps by which a processor used in the embodiment of FIG. 1 returns to an original state after a state change.

DETAILED DESCRIPTION OF THE INVENTION

Figure 1:
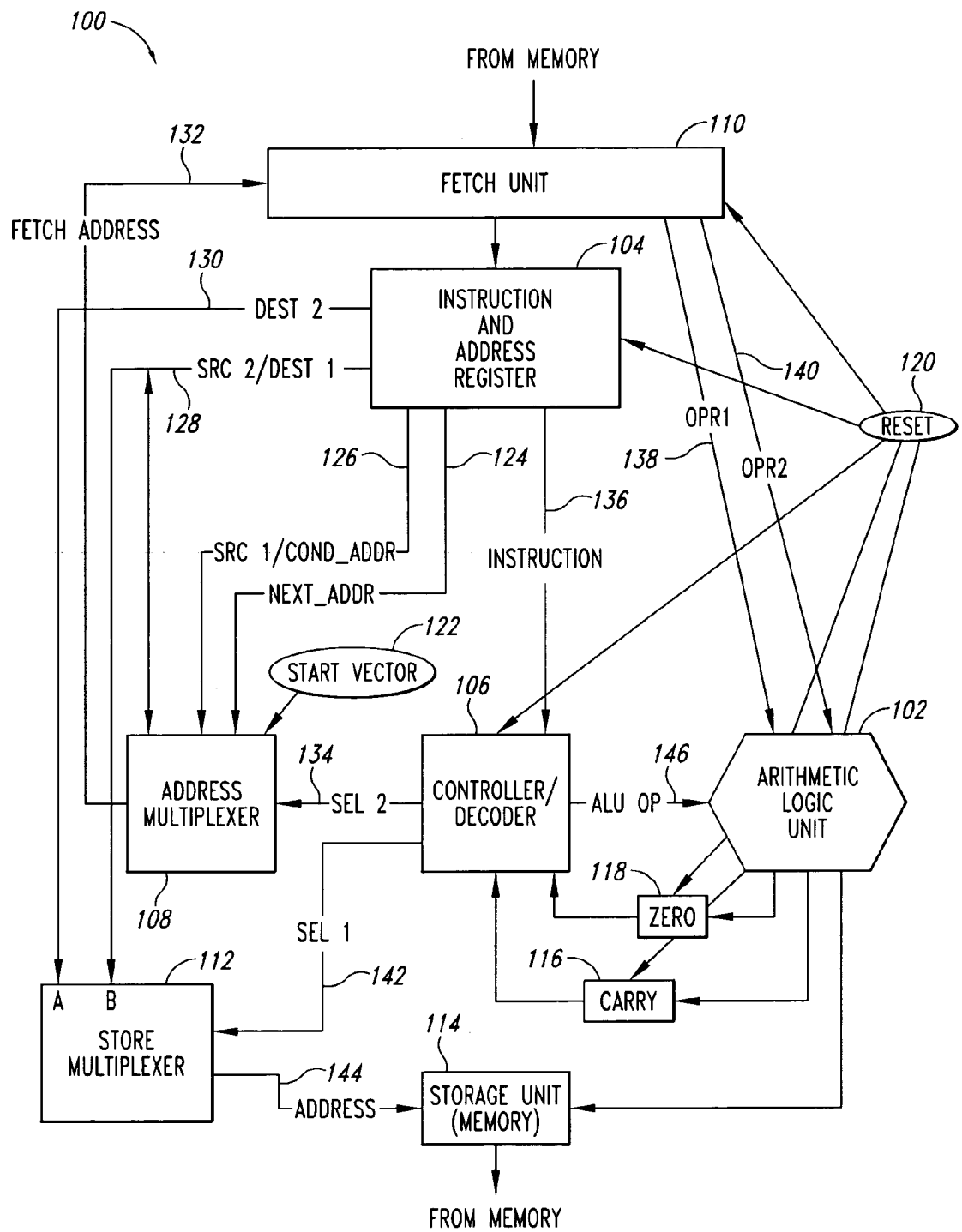
FIG. 1 is a block diagram of a processor that is substantially registerless according to a one embodiment of the present invention.

As shown in FIG. 1, one embodiment of a central processing unit "CPU" 100 according to the present invention provides a Simple Instruction Set Computer or processor (SISC) that drastically reduces the number of registers needed to store and process data. Instead of providing numerous registers into which data (data herein includes instructions, addresses and operands) is temporarily stored, the CPU 100 utilizes only one instruction and address register to process CPU operations.

The CPU 100 accomplishes the before mentioned reductions in registers (and the accompanying reductions in size, speed and power requirements for the CPU) by utilizing an instruction set that encodes addresses directly into the data stream. As shown in FIG. 1, the CPU 100 utilizes many of those components which are commonly available in prior art CPUs, including an Arithmetic Logic Unit (ALU) 102, an Instruction and Address Register (IAR) 104, a Controller/Decoder 106 (ConDec), a Fetch Unit (FU) 110, various multiplexers 108 and 112, various flip flops for Carry 116 and Zero 118 bits, and reset 120 and start vector 122 inputs, which allow the CPU 100 to restart when necessary. However, unlike prior art CPUs, the CPU 100 does not utilize reads/writes from/to various registers and instead directly reads and stores information from/to a Storage Unit 114 (i.e., a memory device).

The CPU 100 is preferably implemented with a reduced set of instructions that are highly orthogonal. As is commonly known in the art, an orthogonal instruction set is generally easier to decode than a corresponding non-orthogonal instruction set because each orthogonal instruction provides basically the same information in the same place and provides no preference for registers into which the data is to be temporarily stored. As such, the processor is not constrained by register requirements and may utilize any memory location as the destination or the source. In the CPU 100, an instruction preferably follows the following format:

[Operation] [NEXT ADDRESS] [SOURCE ADDRESS 1] [SOURCE ADDRESS 2] [DESTINATION ADDRESS]

wherein, Operation specifies the task to be performed by the ALU 102; SOURCE ADDRESS 1 and SOURCE ADDRESS 2 specify the location of the first and second operands, respectively, on which the ALU will perform the specified operation; NEXT ADDRESS specifies the location from memory where the next instruction will be obtained; and DESTINATION ADDRESS specifies the location where the result of the ALU operation is to be stored. However, those skilled in the art appreciate that the CPU 100 may instead utilize non-orthogonal instructions, as desired, upon suitable modification of the data stream and processing elements. The use of control bits, sync patterns, and other devices may be suitably utilized when non-orthogonal data streams are desired.

By utilizing the above instruction format (or a derivation thereof), wherein the NEXT ADDRESS is embodied in the data stream, the CPU 100 provides those various data processing features commonly associated with CPUs without utilizing registers to temporarily store data. As those skilled in the art readily appreciate, the above instruction data structure and method of processing instructions is significantly different from those structures and methodologies commonly utilized in today's CPUs. The computer system preferably does not utilize an instruction counter to track instruction locations and instead embeds a NEXT ADDRESS within each instruction. In its most simple form, the above instruction format provides a JUMP between every instruction. Since a JUMP between each instruction is preferably utilized, software programs utilized by the computer system are not constrained during compiling by requirements that limit the number of JUMPs executed within a program.

Additionally, since the CPU 100 does not constrain compiling by limiting the number of JUMPs, the CPU 100 provides a system that enables a compiler to compile a software program based upon other parameters, for example, the tasks to be completed by the CPU. Similarly, a compiler is able to maximize the utilization of memory. By not requiring instruction sequences to be stored in a specific order (i.e., by configuring each instruction as a JUMP to a subsequent instruction), the computer system allows a compiler to utilize commonly unused blocks of memory commonly present in most memory arrays. Additionally, those skilled in the art appreciate that, as memory utilization is maximized, the actual size of a memory array may be reduced. Lastly, those skilled in the art appreciate the various methods by which a data structure may be efficiently compiled in light of the addressing features provided in each instruction by the computer system.

Additionally, in the preferred embodiment, address fields in each instruction also contain cachability information which is encoded on a single or multiple bits (depending upon the types of cachability supported by the specific embodiment). During compiling, these cachability bits indicate whether specific program instructions are desired to be cached, thereby further increasing the processing speed of the CPU by allowing commonly executed data streams to be placed in cache instead of other memory storage devices. Just as the CPU 100 is able to operate without registers by reading and writing data directly from/to memory devices, the CPU 100 may also achieve significant increases in processing speed by directly reading and writing data from/to cache. Therefore, the CPU 100 provides efficient caching of data at the time of compiling and the efficient utilization of such cached information during processing.

Additionally, since the CPU 100 does not utilize registers to store data and/or instructions, the CPU is not limited by a predetermined maximum instruction length. Unlike prior art systems wherein the amount of data which can be processed by an ALU on a given cycle is limited by a register size, the CPU 100 may be configured with multiple ALUs (for example, in parallel, if needed) to process large data streams. Similarly, extremely small instructions may be efficiently processed without wasting space and/or power on unnecessarily large data registers. Thus, the CPU 100 provides a system that can support instructions of varying lengths and thereby maximize the data processing capabilities of the CPU while reducing power and space requirements.

As mentioned previously, the CPU 100 is not limited to any specific instruction set and may be configured with a limited instruction set designed to accomplish certain tasks. An illustrative example of an instruction set for the CPU 100 might include a MOVE instruction, JUMP instruction, a Single Operand ALU Instruction (SOAI), and a Multiple Operand ALU Instruction (MOAI). Each of these exemplary instructions are described in greater detail below.

A MOVE instruction provides that data located at the SOURCE ADDRESS is moved to a DESTINATION ADDRESS and then processing continues at the NEXT ADDRESS. An exemplary embodiment of a MOVE instruction preferably consists of the following format:
[MOV] [NEXT ADDRESS] [SOURCE ADDRESS] [DESTINATION ADDRESS]
where the location in the data stream of the NEXT ADDRESS, SOURCE ADDRESS, and DESTINATION ADDRESS are orthogonal relative to other data streams. Similarly, for an instruction in which multiple data widths may need to be supported, a MOVE instruction is preferably implemented as a MOVn, where "n" encodes the different data widths supported. For example, "n" might be two bits long and support data widths varying from 8 bits to 64 bits, as show below:

| n | data width |
|---|---|
| 00 | 8 bits (i.e., one byte) |
| 01 | 16 bits |
| 10 | 32 bits |
| 11 | 64 bits. |

Another instruction the present invention preferably includes in an instruction set is a conditional or unconditional JUMP instruction. Such an instruction is preferably formatted as follows:
[JC] [NEXT ADDRESS] [CONDITIONAL ADDRESS]
wherein OP defines the JUMP condition. In the preferred embodiment, the JUMP condition is designated by a ZERO or CARRY bit based upon a result of the ALU's operations. However, those skilled in the art appreciate that a JUMP condition may be based upon any variable or parameter. As such, the present invention is not to be construed as being limited to any specific embodiment of a JUMP condition. When a complement to a given JUMP condition is desired, those skilled in the art appreciate that a separate instruction is not needed. Instead, the compiler creates a complement instruction by suitably swapping the address fields. Similarly, an unconditional JUMP may be created by merely setting both the "NEXT ADDRESS" and the "CONDITIONAL ADDRESS" fields to point to the same address (i.e., the desired destination).

Additionally, as is commonly known in the art, a JUMP can be used to create a HALT instruction. The computer system 10 is designed to support this mode of operation by preferably setting both of the address fields to the same address as the JUMP instruction. When configured in this manner, the present invention suitably repeats the JUMP instruction by jumping back to the same instruction and thereby prohibiting the processor from performing any other operations. In such an embodiment, additional hardware elements, such as a comparator, may be utilized to detect the existence of a looping condition and power-down the processor until an interrupt is received.

The CPU 100 also supports logical and arithmetic operations. Preferably, the ALU 102 supports an instruction set which includes the following operations: NAND, NOR, AND, OR, NOT, ADD, SUB, SHIFT/RDT, RST, and CMP. Those skilled in the art will readily understand the various functions performed by the above operations, and a further explanation will therefore be omitted in the interest of brevity. Additionally, the CPU 100 supports single, double, and multiple operand instructions. For example, the CPU 100 is preferably configured to support a SOAI in the following format:
[ALU] [NEXT ADDRESS] [SOURCE ADDRESS] [ DESTINATION ADDRESS].

As is commonly known in the art, a SOAI commonly includes the shift (rotate) instruction and the invert (NOT) instruction. For a shift instruction, the number of bits to be shifted is preferably encoded into the [OP] field, however, those skilled in the art appreciate that such parameters may be specified in various other manners, including additional data fields, if necessary.

Additionally, the computer system also supports special dual operand ALU instructions. These instructions generally use further coding of the [OP] bits to specify the special instruction. As may be appreciated by those skilled in the art, these instructions are unique in that they use the "SOURCE ADDRESS" and the "DESTINATION ADDRESS" data as the two operands. The DESTINATION ADDRESS is then over-written with the result of the ALU operations such that the original DESTINATION ADDRESS data is lost. Additionally, unlike currently available systems, the CPU 100 allows the result data to be placed anywhere in the system's address space and is not limited to any register or memory locations.

As mentioned previously, another ALU instruction type the CPU 100 also preferably supports is the MOAI, which preferably is in the following format:
[ALU][NEXT ADDRESS] [SOURCE ADDRESS 1] [SOURCE ADDRESS 2] [DESTINATION ADDRESS].

As for the previous ALU instruction formats, the OP field encodes the desired logical or arithmetic function. Additionally, the SOURCE ADDRESS 1 and SOURCE ADDRESS 2 fields preferably specify the location within a memory or similar data storage device where the operands, upon which the ALU operation is to be performed, are located. Those skilled in the art will appreciate the various methods by which an OP field may encode an ALU operation or other operations and the methods by which locations for operands may be designated. Additionally, while the CPU 100 is herein described with reference to the before mentioned instruction types, it is to be appreciated that the CPU 100 is not limited to a specific instruction format, instruction length, or any other parameter and may be configured, as necessary, to process any instruction desired.

The CPU 100 preferably controls various operations in larger systems, such as controlling the Input/Output bus, searching memory, processing video and audio data files, and various other functions. However, the CPU 100 is not limited to playing only a supportive role. The CPU 100 may be suitably configured to provide any processing function desired in any system, with those skilled in the art appreciating the various modifications, if any, which may be necessary to enable the CPU 100 to provide such data processing capabilities.

The CPU 100 may also be implemented within a memory array itself. Due to the significant savings in size realized by the elimination of registers, the CPU 100 may be configured to reside within a "chip" containing a memory array (for example, RAM or ROM). Additionally, since the CPU 100 need not include registers (which generally come in fixed word lengths), by combining multiple CPUs 100 together, multiple CPUs 100 may be suitably configured to process data streams of any length.

Figure 2:
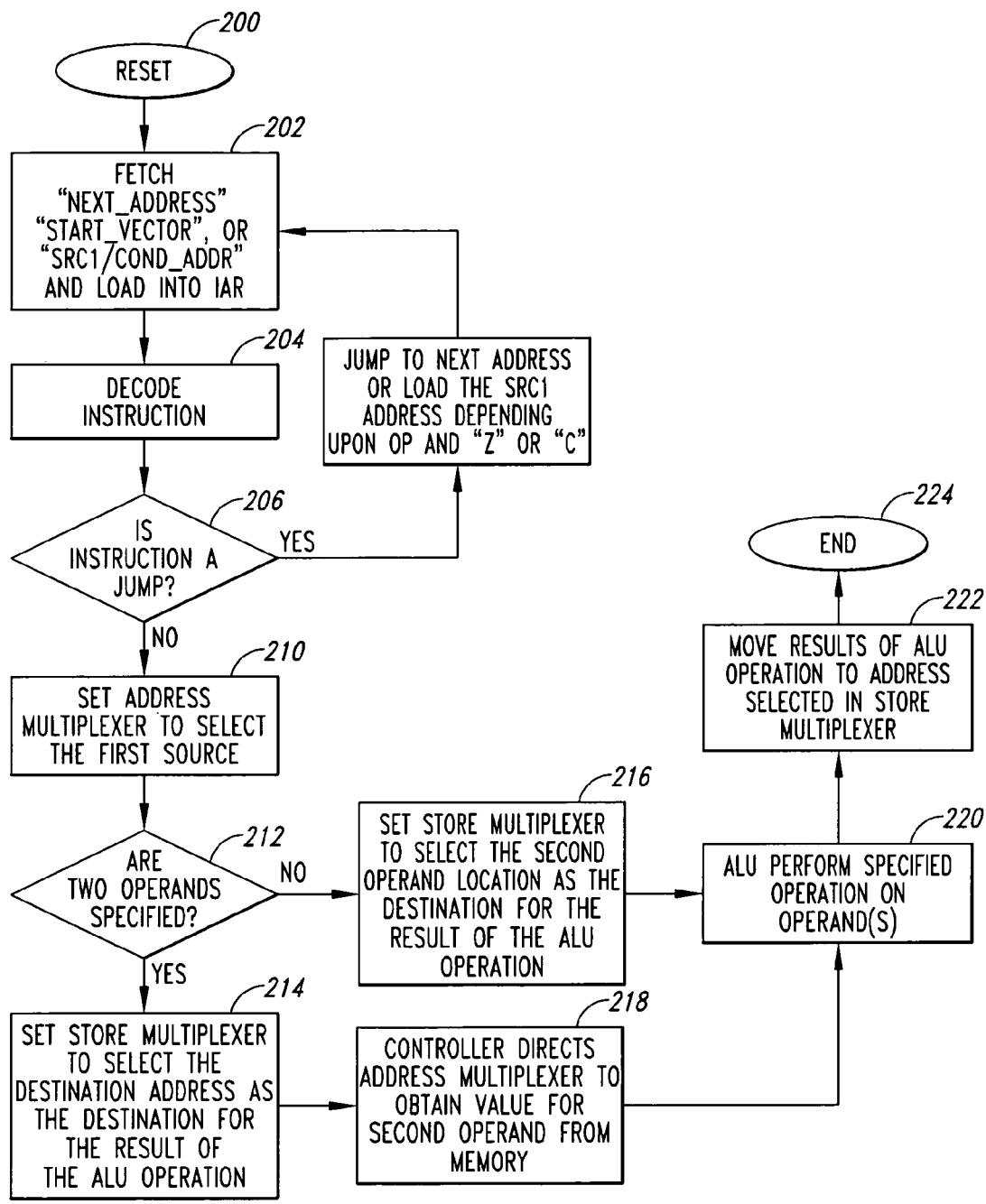
FIG. 2 is a flow diagram of a process by which the embodiment of FIG. 1 retrieves data from memory and processes such data without using registers according.

A process for implementing an instruction utilizing the CPU 100 is shown in FIG. 2, with reference also to the hardware design shown in FIG. 1. As shown in FIG. 2, the process by which the CPU 100 provides operations without the use of registers preferably begins when a RESET signal is received. The RESET signal suitably instructs the CPU 100 to restart processing. As shown in FIG. 1, the RESET signal is preferably received by the Con/Dec 106 at step 200, the ALU 102, the IAR 104, the FU 110, and the Zero and Carry flip-flops 118 and 116, respectively. Those skilled in the art appreciate that a CPU may be interrupted in various manners in order to begin processing a new instruction. Similarly, those skilled in the art also appreciate that an interrupt or reset signal may be received by numerous components in a CPU or system to reset a system as necessary. The CPU 100 suitably supports resets/interrupts when necessary to initiate new processing.

Upon receiving a RESET signal at step 202, the Address Multiplexer (AddMux) 108 determines whether a signal is present from the Start_Vector 122. The Start_Vector 122, when activated, provides an address for a location in a storage device where an instruction to be implemented resides. When an address is being provided by the Start_Vector 122, the AddMux 108 preferably utilizes the address provided by the Start_Vector 122 as the location from which the next instruction is to be fetched. When an address is not being provided by the Start_Vector 122, the AddMux 108 preferably uses the address provided in the previous instruction's NEXT ADDRESS field, which is provided to the AddMux 108 on the NEXT_ADDR line 124.

Upon receiving the address designating the location of the next instruction, the FU 110 suitably contacts the memory storage device and retrieves the desired data stream. The FU 110 first breaks out the various addresses and instructions (opcodes) specified in the data stream and sends these addresses/instructions to the IAR 104. For example, for a MOAI instruction, the IAR 104 preferably receives from the FU 110 an opcode which designates the instruction to be performed. The opcode is provided via the IAR 104 to the Con/Dec 106 via an INSTRUCTION line 136. Additionally, the MOAI receives the NEXT ADDRESS, SOURCE ADDRESS 1, SOURCE ADDRESS 2, and DESTINATION ADDRESS, which are suitably provided by the IAR 104 to the AddMux 108 on the NEXT_ADDR 124, the SRC1/COND_ADDR 126, and the SRC2/DEST 1 128 lines, respectively.

The SRC1/COND_ADDR line 126 and the SRC2/DEST1 line 128 (when a two operand operation is being performed) preferably provide the addresses for the locations where the first and second operands, respectively, are stored. When only a single operand is being utilized for a given instruction, the SRC2/DEST1 line 128 preferably provides a destination address for a result of the operation. However, the operation of the CPU 100 is not limited to single and/or dual operand instructions. Those skilled in the art appreciate that additional operands may be added/deleted to a data stream (with additional data lines being added/deleted to the system 100 shown in FIG. 1).

Additionally, some data streams may specify a constant (for example, the value of Pi), as an operand on a SRC1 or SCR2 address line instead of specifying an address where the constant is located. The CPU 100 suitably distinguishes between addresses and operands in the SOURCE ADDRESS 1 and 2 fields and provides addresses/instructions to the IAR 104 while providing operands to the ALU 102 via the OPR1 138 and OPR2 140 lines.

As mentioned previously, the IAR 104 also receives instructions/opcodes from the FU 110 which are contained within the data stream. These instructions are suitably routed by the IAR 104 to the ConDec 106 on the INSTRUCTION line 136. When the ConDec 106 receives an opcode on the INSTRUCTION line 136 from the IAR 104, the ConDec 106 suitably decodes the instruction at step 204. The decoding of opcodes by controllers is well known in the art. The CPU 100 may utilize any known or to be known method for decoding an instruction and is not limited to decoding specific types of instructions or decoding such instructions using specific procedures.

In addition to providing the instruction to the controller 106 for decoding, the IAR 104 also breaks out each field of the data stream and suitably provides this information to the AddMux 108. As shown in FIG. 1, the IAR 104 preferably provides three input lines to the AddMux 108, namely the SRC2/DEST 1 line 128, the SRC1/COND_ADDR line 126, and the NEXT_ADDR line 124. However, the CPU 100 may be configured such that more or less input lines for addresses are utilized by the AddMux 108, as necessary. For example, when a JUMP instruction is retrieved by the FU 110, a NEXT ADDRESS and a SRC1/COND_ADDR (CONDITIONAL ADDRESS) are utilized, while the SRC2/DEST 1 address is not utilized by the AddMux 108.

After the instruction has been decoded and the addresses provided to the AddMux 108, the CPU 100 determines at step 206 whether the instruction is a JUMP. If the instruction is a JUMP, the CPU 100 suitably fetches the next instruction from the memory location specified on the NEXT_ADDR 124 line for the current data stream or from the memory location specified on the SRC1/COND_ADDR 126 line. The AddMux 108 determines which address line to process based upon the value provided by the ConDec 106 on the SEL2 134 line. Similarly, the ConDec 106 suitably determines which address to select based upon the Instruction decoded, whether the Reset 120 has been triggered, and the values provided by the Carry 116 and Zero 118 flip flops at step 208. Additionally, the CPU 100 may suitably utilize known or future developed multiplexer and controller/decoder operations to determine from which address in memory to retrieve instructions, as necessary.

As described above, when the instruction to be executed is a JUMP, the CPU 100 suitably fetches the instruction located at the JUMP address, and resumes processing by decoding the new instruction and determining whether a subsequent JUMP instruction is present at steps 202, 204 and 206. In the instance of a HALT instruction, the CPU 100 may continue to loop indefinitely until a reset is received or additional hardware, such as a comparator, determines that a HALT has occurred and suitably interrupts the system's processing.

When the decoded instruction is not a JUMP, the CPU 100 continues processing by configuring the AddMux 108 to select the SRC1/COND_ADDR line 126. When the operand is not a constant, the CPU 100 is preferably configured such that the SRC1/COND_ADDR line 126 (or SRC2/DEST 1 line 128) designates an address for a memory location where the first/second operand is stored. At this point, the FU 110 retrieves data from the SRC1 address of memory or a similar data storage, and provides this data to the ALU 102 over the OPR1 line 138.

In the CPU 100, the FU 110 retrieves variables and data parameters from memory locations. The CPU 100, however, may also be suitably configured such that a data stream provides the variables and data parameters to be utilized in processing an instruction within the data stream itself and does not require the FU 110 to retrieve the data from additional memory locations. Those skilled in the art appreciate, for example, that a data stream of 32 bits could be designated such that the first eight bits specify an operation to be performed, the second four bits specify a NEXT ADDRESS, the third eight bits specify a first operand, the fourth eight bits specify a second operand or an address, and the last four bits specify a destination where the result of the ALU operation is to be stored. A FU 110 may be suitably designed to separate such bits into their respective categories and provide such data bits to the appropriate devices which utilize the data bits.

After the data variables for the first operand have been retrieved, the CPU 100 preferably determines at step 212 whether a single operand or two operands are specified in the data stream. The CPU 100 may make this determination based upon various factors including, but not limited to, the length of the data stream and the operation to be performed by the ALU and/or the controller. When two operands are specified, the ConDec 106 preferably directs the Store Multiplexer (StoreMux) 112 to select the address provided on the DEST2 line 130 as the destination for the results of the ALU operation (Block 214). Also, the ConDec 106 directs the FU 110 to retrieve from memory the value for the second operand, which is then provided to the ALU 102 via the OPR2 line 140 (Block 218). Similarly, when a single operand instruction is being processed (Block 216), the ConDec 106 preferably directs the StoreMux 112 to select the SRC2/DEST1 address as the destination for the result of the ALU operation.

After the operand(s) have been retrieved from the data stream, the CPU 100 continues at step 220 by performing the specified operation. The operation to be performed by the ALU 102 is provided by the ConDec 106 via the ALU OP line 146. However, the present invention may be suitably configured such that operations/instructions are provided from the IAR 104 and/or the FU 110 directly to the ALU 102 with the appropriate control signals being provided by the ConDec 106.

After the ALU 102 has performed the specified operation, the result is then moved to the selected destination address at 222. As shown in FIG. 1, the StoreMux 112 preferably includes two input address lines, the SRC2/DEST1 line 128 and the DEST2 line 130. Additionally, a control line, SEL1 142, provides control signals from the ConDec 106 that designate which address to utilize when storing a result. Also, the ADDRESS line 144 provides an output from the StoreMux 112, which designates where in a Storage Unit 114 a result is to be recorded. While the CPU 100 is depicted as showing two address locations from which the ConDec 106 may select to record a result, it is to be appreciated that the StoreMux 112 may be configured to support more than two addresses. Additionally, the StoreMux 112 may also be connected to multiple storage devices, including Memory 114, all of which may be suitably designated via the StoreMux 112 using known in the art techniques.

Figures 3A, 3B:
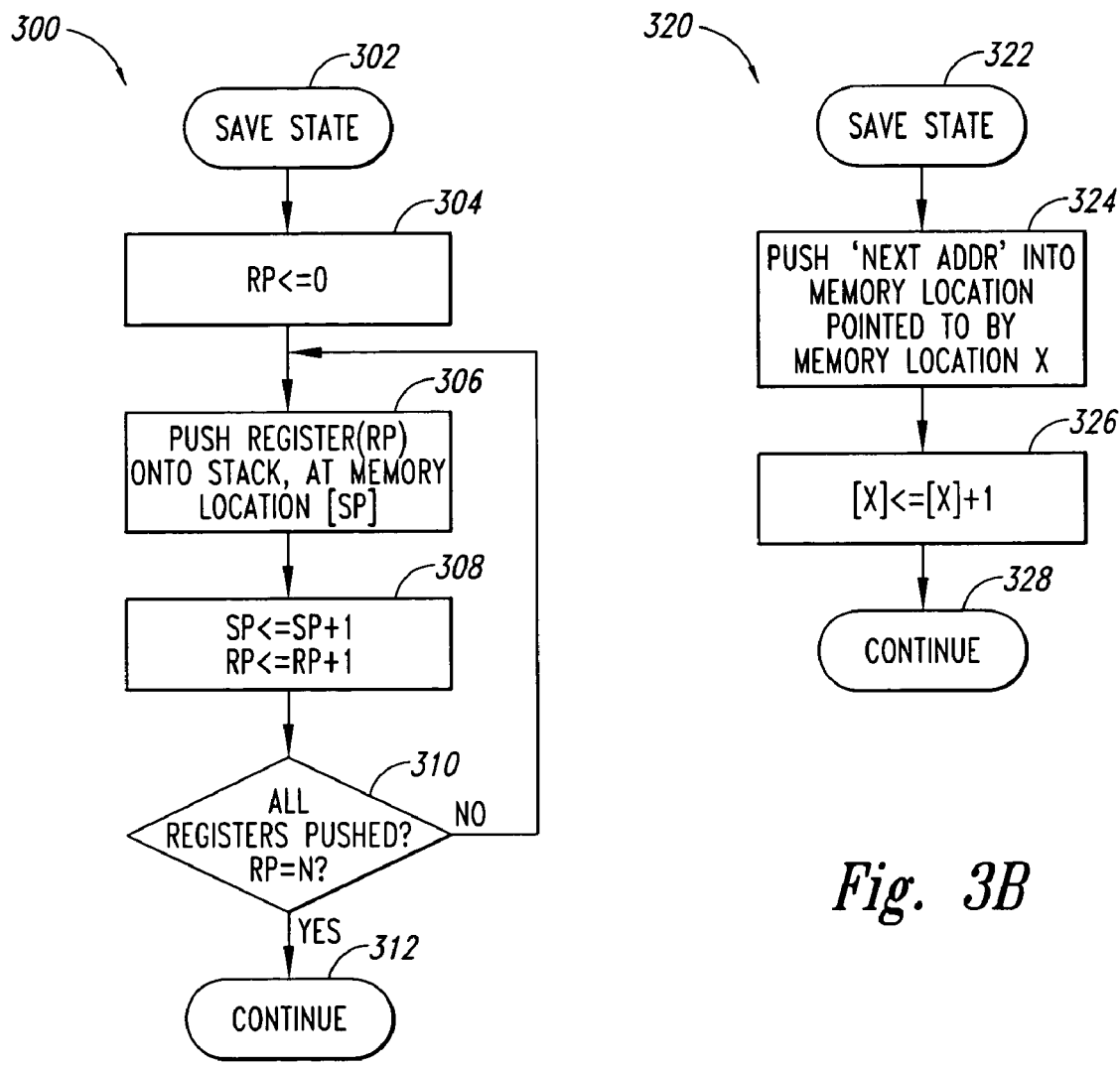
FIG. 3A is a flow diagram representing the processing steps by which a prior art processor changes states.
FIG. 3B is a flow diagram representing the processing steps by which a processor used in the embodiment of FIG. 1 changes states.

Additionally, the CPU 100 provides quicker state change processing since the CPU 100 does not store data in numerous registers and thus, does not have to save the contents of such registers in memory before implementing the desired state change. As mentioned previously with respect to FIG. 3A, currently available systems commonly must perform multiple steps for each register utilized by the CPU when changing states. In contrast, FIG. 3B illustrates the processing steps the CPU 100 performs when changing states. More specifically, when implementing a state change using the present invention, the CPU 100 receives a request to save the state at step 322. The CPU 100 then retrieves the NEXT ADDRESS from the data stream for the currently implemented instruction and pushes this address location into a preselected memory location, location "X" (Block 324). The CPU 100 then increments the value of the address identified as location "X" by one and verifies the NEXT ADDRESS was loaded into the X location at step 326. The CPU 100 preferably increments the value of X by one to ensure that a subsequent state change (for example, from a second task to a third task) may also be accomplished, and the NEXT ADDRESS for the second task is suitably stored before the third task is accomplished. At this point, the CPU resumes processing with the instruction for which the state change was requested (Block 328). In short, the CPU 100 preferably requires only one parameter, the NEXT ADDRESS to be stored before a state change may be implemented.

When the processing for the second task has been completed, the CPU 100 resumes the first task. FIG. 4B illustrates the process by which the CPU 100 recovers from a state change. As shown, this process preferably begins when the second task is completed and a restore state signal is generated at step 422. At this point, the CPU 100 recalls the NEXT ADDRESS from memory location "X" for the interrupted task (Block 424) and decrements the value of X by one (1) at step 426. In this manner, the present invention coordinates state changes and returns to original states regardless of the number of state changes upon state changes that have been requested. For example, when a first task is interrupted by a second task that is interrupted by a third task, upon completing the third task, X points to a memory location in which the NEXT ADDRESS for the second task is stored. The CPU 100 transfers the NEXT ADDRESS data and decrements X by one. Once the second task is completed, the restore state indicator is activated telling the CPU 100 to retrieve from register X the NEXT ADDRESS, which now points to the NEXT ADDRESS for the first task. As such, the CPU 100 greatly simplifies state changes, thereby allowing the system to focus more of its processing capabilities upon solving problems instead of swapping and saving data.

As described herein, the CPU 100 may be utilized in various embodiments either as a stand-alone processor or in parallel with various other processors. In another embodiment of the present invention, the CPU 100 is utilized in memory as a built in self-test device. Instead of utilizing prior art processes of burning memory chips, testing the chip on a testing stand, fixing errors in the memory chip, packaging the chip, testing the chip again, and, if acceptable, shipping the chip, the present invention may be built onto the chip itself and used to test the memory device. The CPU 100 is aptly suited for verifying a memory device because it directly reads from and writes to memory without requiring extra processing steps, such as temporarily storing information in registers.

While the present invention has been described and illustrated with reference to a preferred embodiment, it will be appreciated by those skilled in the art that changes in the above descriptions or illustrations may be made with respect to form or detail without departing from the spirit or scope of the present invention as expressed in the following claims.

The invention claimed is:

1. A system for processing data, comprising:
   a fetching unit operable to fetch a data stream directly from a first location within a memory device designated by a first address, the data stream including an instruction and a next address, each of the addresses designating a location within the memory device;

a storage device in communication with the fetching unit, the storage device being operable to temporarily store the instruction and the next address; and a control unit in communication with the storage device, the control unit being operable to receive the instruction and control an implementation of the instruction using the addresses.

2. The system of claim 1 wherein the storage device further comprises an instruction register and an address register.

3. The system of claim 1 wherein the control unit is structured to implement the instruction by directing the fetching unit to retrieve a second data stream from a location designated by the next address, returning a first result, and directing the fetching unit to retrieve a third data stream from a location designated by a destination address responsive to a second result being returned.

4. The system of claim 1 wherein the first address and the next address designate the same location within a memory device.

5. The system of claim 1 wherein the system further comprises a comparator that is structured to compare the next address and a destination address and to generate a halt signal when both addresses designate the same location within a memory device as the first address.

6. The system of claim 1 wherein the data stream further comprises a first source address that identifies a location within the memory device.

7. The system of claim 6 wherein the first source address provides a first operand.

8. The system of claim 7 wherein the control unit responds to the first source address by directing the fetching unit to fetch a first operand from a location in the memory device identified by the first source address.

9. The system of claim 8 wherein the control unit is operable to cause the first operand to be saved at a destination address responsive to the fetching of the first operand.

10. The system of claim 6 wherein each of the next address and the first source address reference a respective location within the memory device.

11. The system of claim 6 wherein at least one of the next address and the first source address references a location within a second memory device.

12. The system of claim 6 wherein the system further comprises an instruction implementation unit in communication with the control unit and the fetching unit, the implementation unit being operable to implement the instruction by receiving a first operand retrieved by the fetching unit from a location within the memory device referenced by the first source address, utilizing the operand under the direction of the control unit, and outputting a result of the implementation.

13. The system of claim 12 wherein the instruction implementation unit further comprises an arithmetic logic unit.

14. The system of claim 13 wherein the instruction further comprises a single operand ALU instruction.

15. The system of claim 12 wherein the data further comprises a second source address, and the control unit is operable to direct the fetching unit to retrieve a second operand from a location within a memory device identified by the second source address, the fetching unit being operable to provide the second operand to the instruction implementation unit, the instruction implementation unit being operable to utilize at least one of the first operand and the second operand while implementing the instruction under the direction of the control means and outputting a result of the implementation.

16. The system of claim 15 wherein the instruction further comprises a multiple operand ALU instruction.

17. The system of claim 12 wherein the system further comprising an address selection unit in communication with the storage device and the control unit, the address selection unit being operable and the control means being operable to select a fetch address from at least one input address.

18. The system of claim 17 wherein the address selection unit receives as an input address at least one address selected from the group consisting of: a next address, a first source address, a second source address, a destination address, and a conditional address.

19. The system of claim 18 wherein the system further comprises:

a first designating unit; and a second designating unit, the second designating unit being operable to receive a status indicator from the instruction implementation unit and communicate the status indicator to the control unit.

20. The system of claim 19 wherein the control unit is structured to determine which of the input addresses is used to designate the fetch address from the address selection unit based upon a status signal provided by each of the designating units.

21. The system of claim 19 wherein the first designating unit is operable to indicate whether a zero status has occurred in the instruction implementation unit.

22. The system of claim 19 wherein the second designating unit is operable to indicate whether a carry status has occurred in the instruction implementation unit.

23. The system of claim 1 wherein the memory device comprises at least one device selected from the group consisting of: a random access memory, a read only memory, a hard magnetic disc, a cdrom, a digital versatile disc, a cache memory, a magnetic storage device, and an optical storage device.

24. The system of claim 1 wherein the system further comprises a storage selection unit in communication with the control unit and the storage device, the storage selection unit being and the control unit being operable to select a storage address from at least one destination address.

25. The system of claim 24 wherein the storage selection unit receives as a destination address at least one address selected from the group consisting of: a second source address, a destination address, and a conditional address.

26. The system of claim 25 wherein the control unit is operable to direct the storage selection unit to select a destination address based upon a type of instruction received by the control unit.

27. The system of claim 24 wherein the storage address designates a location within a memory device in which the result is to be stored.

28. A system for processing data, comprising:

a fetching unit operable to fetch a data stream directly from a first location within a memory device designated by a first address, the data stream including an instruction and a destination address, each of the addresses designating a location within the memory device;

a storage device in communication with the fetching unit, the storage device being operable to temporarily store the instruction and the destination address; and a control unit in communication with the storage device, the control unit being operable to receive the instruction and control an implementation of the instruction using the addresses.

29. The system of claim 28 wherein the storage device further comprises an instruction register and an address register.

30. The system of claim 28 wherein the control unit is structured to implement the instruction by directing the fetching unit to retrieve a data stream from a location designated by the destination address responsive to a second result being returned.

31. The system of claim 28 wherein the data stream further comprises a first source address that identifies a location within the memory device.

32. The system of claim 31 wherein the first source address provides a first operand.

33. The system of claim 32 wherein the control unit responds to the first source address by directing the fetching unit to fetch a first operand from a location in the memory device identified by the first source address.

34. The system of claim 33 wherein the control unit is operable to cause the first operand to be saved at the destination address responsive to the fetching of the first operand.

35. The system of claim 31 wherein each of the next address, the destination address and the first source address reference a respective location within the memory device.

36. The system of claim 31 wherein at least one of a next address, the first source address, and the destination address references a location within a second memory device.

37. The system of claim 31 wherein the system further comprises an instruction implementation unit in communication with the control unit and the fetching unit, the implementation unit being operable to implement the instruction by receiving a first operand retrieved by the fetching unit from a location within the memory device referenced by the first source address, utilizing the operand under the direction of the control unit, and outputting a result of the implementation.

38. The system of claim 37 wherein the instruction implementation unit further comprises an arithmetic logic unit.

39. The system of claim 38 wherein the instruction further comprises a single operand ALU instruction.

40. The system of claim 37 wherein the data further comprises a second source address, and the control unit is operable to direct the fetching unit to retrieve a second operand from a location within a memory device identified by the second source address, the fetching unit being operable to provide the second operand to the instruction implementation unit, the instruction implementation unit being operable to utilize at least one of the first operand and the second operand while implementing the instruction under the direction of the control means and outputting a result of the implementation.

41. The system of claim 40 wherein the instruction further comprises a multiple operand ALU instruction.

42. The system of claim 37 wherein the system further comprising an address selection unit in communication with the storage device and the control unit, the address selection unit being operable and the control means being operable to select a fetch address from at least one input address.

43. The system of claim 42 wherein the address selection unit receives as an input address at least one address selected from the group consisting of: a next address, a first source address, a second source address, a destination address, and a conditional address.

44. The system of claim 43 wherein the system further comprises:
a first designating unit; and
a second designating unit, the second designating unit being operable to receive a status indicator from the instruction implementation unit and communicate the status indicator to the control unit.

45. The system of claim 44 wherein the control unit is structured to determine which of the input addresses is used to designate the fetch address from the address selection unit based upon a status signal provided by each of the designating units.

46. The system of claim 44 wherein the first designating unit is operable to indicate whether a zero status has occurred in the instruction implementation unit.

47. The system of claim 44 wherein the second designating unit is operable to indicate whether a carry status has occurred in the instruction implementation unit.

48. The system of claim 28 wherein the memory device comprises at least one device selected from the group consisting of: a random access memory, a read only memory, a hard magnetic disc, a cdrom, a digital versatile disc, a cache memory, a magnetic storage device, and an optical storage device.

49. The system of claim 28 wherein the system further comprises a storage selection unit in communication with the control unit and the storage device, the storage selection unit being and the control unit being operable to select a storage address from at least one destination address.

50. The system of claim 49 wherein the storage selection unit receives as a destination address at least one address selected from the group consisting of: a second source address, a destination address, and a conditional address.

51. The system of claim 50 wherein the control unit is operable to direct the storage selection unit to select a destination address based upon a type of instruction received by the control unit.

52. The system of claim 49 wherein the storage address designates a location within a memory device in which the result is to be stored.

53. A method for processing data, the method comprising:
obtaining a data stream from a location within a memory device designated by a first address, the data stream including an instruction, a next address, and a destination address;
decoding the instruction;
determining whether the decoded instruction contains an instruction to access a fetch address;
accessing the next address when the decoded instruction contains an instruction to access the fetch address and a status indicator designates the next address as the fetch address; and
accessing the destination address when the decoded instruction contains an instruction to access the fetch address and the status indicator designates the destination address as the fetch address.

54. A method for processing data, the method comprising:
obtaining a data stream from a location within a memory device designated by a first address, the data stream including an instruction, a next address, and a destination address;
decoding the instruction;
determining whether the decoded instruction contains an instruction to access a fetch address;

accessing the next address when the decoded instruction contains an instruction to access the fetch address and a status indicator designates the next address as the fetch address;

accessing the destination address when the decoded instruction contains an instruction to access the fetch address and the status indicator designates the destination address as the fetch address; and comparing the next address and the destination address against the first address and halting the processing of data when the next address, the destination address, and the first address designate the same location within a memory device.

55. A method for processing data, the method comprising:

obtaining a data stream from a location within a memory device designated by a first address, the data stream including an instruction, a next address, a destination address, and a first source address, the first source address identifying a location within a memory device at which a first operand is stored;

fetching the first operand from the first source address;

decoding the instruction;

determining whether the decoded instruction contains an instructions to access a fetch address;

jumping to the next address when the decoded instruction contains an instruction to access a fetch address and a status indicator designates the next address is the fetch address; and jumping to the destination address when the decoded instruction contains an instruction to access a fetch address and the status indicator designates the destination address is the fetch address.

56. The method of claim 55 wherein the method further comprises:

determining if the data stream contains a second source address;

fetching a second operand stored at a location within a memory device designated by the second source address when the second source address is present;

executing the instruction upon the first operand and the second operand; and storing a result of the execution of the instruction in the destination address.

57. The method of claim 55 wherein the method further comprises:

determining that the data stream does not contain a second source address;

executing the instruction upon the first operand; and storing a result of the execution of the instruction in the destination address.

* * * * *